May 6, 1969
I. ITZKAN
PRISMATIC MEMBER FOR DIFFERENTIALLY CHANGING DIRECTIONS OF LIGHT BEAMS INCIDENT THEREON
Filed Feb. 8, 1966
3,442,571
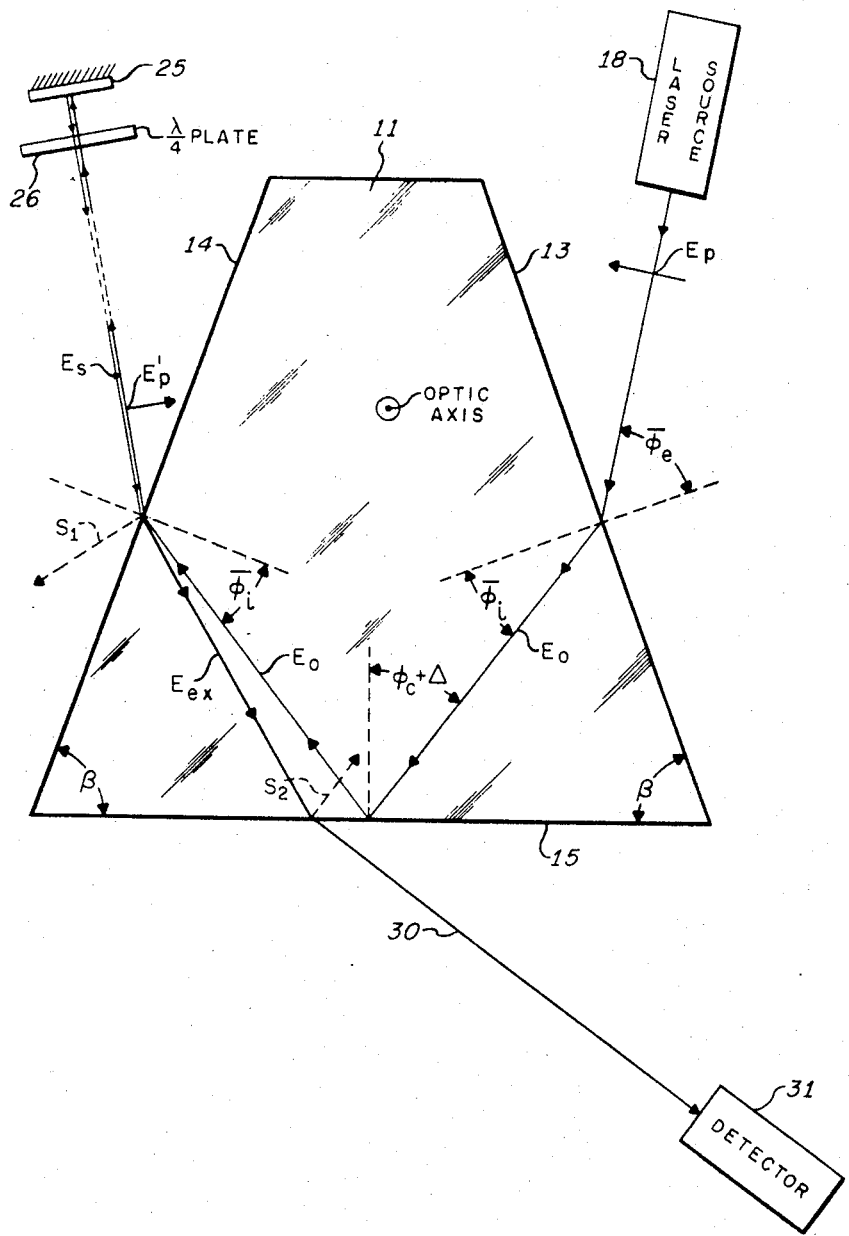
INVENTOR.
IRVING ITZKAN
BY
John H. Gallagher
ATTORNEY

3,442,571
PRISMATIC MEMBER FOR DIFFERENTIALLY CHANGING DIRECTIONS OF LIGHT BEAMS INCIDENT THEREON

Irving Itzkan, Great Neck, N.Y., assignor to Sperry Rand Corporation, a corporation of Delaware
Filed Feb. 8, 1966, Ser. No. 525,871
Int. Cl. G02f 1/26
U.S. Cl. 350—157      10 Claims This invention relates to a transparent prismatic member that exhibits birefringent effects to orthogonally plane polarized light beams and in particular to the use of such a member to change the directions of propagation of the two light beams to perform an optical duplexing or isolating function.

It is well known that orthogonally plane polarized light beams may be separated, combined, or their directions of propagation differentially affected by the use of any of a variety of different types of prisms such as Nicol, Rochon, or Wollaston prisms. Although these prisms perform satisfactorily with light beams of low power levels, they cannot be used with high power light beams that are produced by some laser devices because the named prisms are formed by cementing together two different prismatic members and the cements that are used cannot withstand the high power levels without deteriorating.

It therefore is an object of this invention to provide a transparent prismatic member for differentially affecting the direction of propagation of two orthogonal plane polarized light beams, said member being free of any cemented interfaces or coatings that might be adversely affected by high power light beams.

The invention will be described by referring to the accompanying simplified illustration which depicts the present invention as a duplexer in an object detection system to optically isolate a high-power light source from a detector which receives the reflected light from a remotely located object.

The prismatic member 11 is in the shape of a trapezoidal prism whose two planar side surfaces 13 and 14 are oppositely inclined with respect to each other and intersect the planar base surface 15 at the respective corner angles $\beta$, which in this instance are of the same magnitude. Side surfaces 13 and 14 and the base surface 15 all are optically smooth to within approximately one-quarter wavelength of the light that will propagate through them. Prismatic member 11 is made of a homogenous uniaxial crystalline material which is crystallograprically oriented so that its optic axis is perpendicular to the plane of the drawing, as illustrated conventionally by the encircled dot. In this embodiment of the invention the crystalline material possesses a negative birefringence to orthogonally plane polarized light. That is, the extraordinary index of refraction is less than the ordinary index of refraction. Calcite possesses this property and is ideally suited for the present invention.

A laser source 18 directs a collimated beam $E_p$ of plane polarized light onto the first planar side surface 13 at an angle $\overline{\phi}_e$, as measured from the broken line that is normal to side surface 13. Laser source 18 may be any laser device which inherently produces plane polarized light such as a solid state crystalline material having an internal axis, or it may be of a different type whose emission is not inherently plane polarized but which may be plane polarized by means of Brewster angle windows, for example. The light source need not emit coherent light if this characteristic is not important, although it still is desirable that the light beam that enters the prismatic member be plane polarized. Beam $E_p$ is polarized parallel to the plane of incidence and the angle $\overline{\phi}_e$ is chosen to be the external polarizing, or Brewster, angle so that the beam is substantially totally transmitted through the surface 13 and into the prismatic member 11. The polarization of this beam within the prismatic member 11 is perpendicular to the optic axis of the material and thus the beam constitutes an ordinary wave beam $E_o$. The beam $E_o$ is incident on the base surface 15 at an angle whose magnitude is greater than the critical angle $\phi_c$ (measured relative to the broken line that is normal to surface 15) so that the beam is substantially totally internally reflected from the base surface 15. To achieve this total internal reflection from the base surface 15 the right corner angle $\beta$ is chosen to have the magnitude $\beta = \overline{\phi}_1 + \phi_c + \Delta$, where $\Delta$ is a small angular increment to assure that the critical angle is exceeded, and $\overline{\phi}_1$ is the internal polarizing angle at surface 13.

The $E_o$ beam that is obliquely reflected from base surface 15 then is incident on the left planar side surface 14 and the angle of incidence is chosen to be the internal polarizing, or Brewster, angle $\overline{\phi}_1$ so that the beam is substantially totally transmitted through the side surface 14. This beam then propagates in free space as the beam $E_p'$ which is plane polarized parallel to the angle of incidence. In this description relating to an object detection system, the beam $E_p'$ will propagate in space to a remotely located reflecting object 25 which will reflect at least a portion of that beam back toward the prismatic member 11. In accordance with this invention, it is desired that the portion of the light that is redirected toward the prismatic member 11 from the remotely located object 25 be polarized orthogonally to the plane polarization of the outgoing beam of light $E_p'$. In the event that the remotely located object 25 is a cooperative target, a quarter wave plate 26 may be included as a portion of that remotely located object so that upon twice passing through the quarter wave plate 26 the plane polarization of the $E_p'$ beam is rotated 90°, the return beam now being designated $E_s$. The outgoing beam $E_p'$ and the returning orthogonally polarized beam $E_s$ are illustrated as being spatially displaced only for convenience of illustration, it being understood that in practice these beams will be coincident.

If the remotely located object 25 is not a cooperative target which has been provided with the quarter wave plate 26, it undoubtedly will have a non-planar reflecting surface which will function to depolarize to some extent the linearly polarized outgoing beam $E_p'$. In this event at least a portion of the returned beam will be orthogonally polarized to constitute the desired light beam $E_s$ which is plane polarized orthogonally to the plane of incidence that is formed with the second side surface 14.

Because the returned beam $E_s$ is plane polarized perpendicular to the plane of incidence of side surface 14 a small portion of that light beam will be transversely reflected along the spurious path $S_1$, but a major portion of it will be transmitted through the surface 14 and will be directed toward the base surface 15. Because this light beam is a plane polarized parallel to the optic axis it constitutes a beam $E_{ex}$ of extraordinary light waves which "see" a smaller index of refraction in the calcite material than was presented to the beam of ordinary light $E_o$ that was transmitted through the first side surface 13. As a consequence, the beam $E_{ex}$ will be refracted by a lesser angle than an ordinary wave beam would have been so that the path of the $E_{ex}$ beam is angularly divergent from the path of the $E_o$ beam, as illustrated in the drawing. The $E_{ex}$ beam is incident on the base surface 15 at an angle somewhat less than the critical angle $\phi_c$ of internal reflection so that a major portion of that light beam is directed along the external path 30 toward the detector means 31. A minor portion of the $E_{ex}$ light beam will be reflected from the base surface 15 along the spurious path $S_2$.

The high isolation that is achieved between the laser source 18 and the detector 31 results from the fact that the plane polarized laser beam $E_o$ is substantially completely reflected from the base surface 15 and also is substantially completely transmitted through the second side surface 14. Therefore, very little of the transmitted laser beam is spuriously internally reflected within the prismatic member 11 so that there is very little undesirable coupling of the transmitter laser beam to the detector 31. In a practical arrangement, substantially as illustrated in the accompanying drawing, a source-to-detector isolation of approximately 70 decibels was obtained with a calcite prism and with a helium-neon laser operating at a wavelength of approximately .6328 micron. The physical dimensions of the calcite prism were approximately as follows:

| | |
|---|---|
| Length of surfaces 13, 14 and 15 | 1 inch. |
| Width of prismatic member 11 (direction into plane of drawing) | 1 inch. |
| $\beta$ | 69° 30'. |
| Optical finish on surfaces 13, 14 and 15 | Approximately quarter wavelength. |

In addition to being useful in an object detection system the present invention also may be employed to perform a duplexing function in a two-way communication system in which transmission and reception between stations is provided by respective orthogonally plane polarized light beams.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical device for differentially changing the directions of propagation of orthogonal plane palorized light beams comprising,
    a transparent prismatic member that exhibits birefringent effects to orthogonal plane palorized light beams,
    said member having a base surface and first and second oppositely inclined side surfaces that join said base surface to form respective acute corner angles of said prismatic member,
    said corner angles and the indices of refraction presented by said member to orthogonal plane palorized light beams being proportioned so that a first plane palorized light beam transmitted through said first side surface is totally internally reflected from said base surface and passes through said second surface polarized in its plane of incidence at its polarization angle and a second orthogonal plane polarized light beam that propagates between said second and base surfaces, and is coincident with said first beam at one of the two last-named surfaces, is refracted by an angle different from that of said first beam.

2. The combination claimed in claim 1 wherein said second light beam is externally incident on said second side surface and is incident on said base surface at an angle less than its critical angle for total internal reflection, whereby at least a portion of said light beam is transmitted through said base surface.

3. The combination claimed in claim 2 and further including,
    means for producing said first beam of plane polarized light and for directing said first beam onto said first side surface, and
    light utilization means for receiving light from said second light beam that is transmitted through said base surface.

4. The combination claimed in claim 3 wherein said first light beam is incident on said first side surface polarized in its plane of incidence and at its polarization angle, whereby said first beam is substantially totally transmitted through said first side surface.

5. An optical device for changing the directions of propagation of light beams comprising,
    a transparent prismatic member that exhibits birefringent effects to first and second orthogonal plane polarized light beams,
    said member having a planar base surface and first and second oppositely inclined planar side surfaces that join said base surface to form acute corner angles of said prismatic member,
    means for directing a first beam of plane polarized light through said first side surface and thence onto said base surface,
    the corner angle formed by said first side surface and said base surface being proportioned to direct said first beam of light onto said base surface at an angle greater than critical angle of internal reflection,
    the corner angle formed by said second side surface and said base surface being proportioned so that the first beam of light reflected from said base surface is incident at its internal polarizing angle on said second side surface,
        a given one of said surfaces being disposed relative to a second orthogonally plane polarized light beam that is externally directed onto and through said given surface so that the paths of said two beams between the base and second side surfaces are angularly displaced by an angle whose vertex is on one of the two last-recited surfaces and whose magnitude is a function of the difference between the indices of refraction presented by said member to said orthogonally polarized beams.

6. In an optical duplexing system for differentially changing the directions of two orthogonally polarized light beams, the combination including,
    a birefringent prismatic member comprised of first and second oppositely inclined planar surfaces that join a third planar surface to form respective acute corner angles at spaced parallel edges,
    means for directing a first light beam through a first one of said inclined surfaces and onto said third surface,
        said light beam being plane polarized parallel to its plane of incidence and being incident on said first inclined surface at its polarizing angle,
        the magnitude of the first one of said corner angles being proportioned with respect to said polarizing angle and to a first index of refraction presented by said member to said first light beam to cause substantially total internal reflection of said beam from said third surface and then to be internally incident on said second inclined surface,
        the magnitude of the second corner angle being proportioned to cause said first light beam to be internally incident on said second inclined surface at its polarizing angle, whereby said first beam is substantially totally transmitted through said second inclined surface,
    said second inclined surface being inclined relative to a second orthogonally plane polarized light beam that is externally incident thereon at the region where said first beam is internally incident so that the paths of said two light beams between said base and second side surfaces are angularly displaced by an angle which is a function of the difference between the indices of refraction presented by said member to said orthogonally polarized beams,
        the indices of refraction presented by said member to said two light beams being chosen to cause said second beam to be incident on said third surface at an angle less than its critical angle for total internal reflection, whereby at least a portion of said second beam is transmitted through said third surface.

7. Apparatus for performing a duplexing function for light beams comprising, a negative birefringent uniaxial prismatic member comprised of a planar base surface and first and second oppositely inclined planar side surfaces that meet said base surface along spaced parallel straight edges to form acute corner angles of said member, means for directing a first beam of plane polarized light through the first side surface and onto said base surface, said first light beam being polarized parallel to its plane of incidence and orthogonal to the optic axis of said member, the first corner angle formed by said first side surface and said base surface being proportioned relative to the direction of said first light beam and to the index of refraction presented by said member so that the first light beam is incident on the first side surface at its polarizing angle and is incident on said base surface at an angle greater than its critical angle for total internal reflection, whereby said first light beam is totally transmitted through said first surface, is totally internally reflected from said base surface, and is internally incident on said second side surface, the second corner angle formed by said second side surface and said base surface being proportioned so that the first light beam reflected from said base surface is internally incident on said second side surface at its internal polarizing angle, whereby said light beam is substantially completely transmitted through said second side surface, and the indices of refraction of said member and the magnitude of said second corner angle being proportioned so that an orthogonal beam of plane polarized light externally incident on said second surface at the region where said first light beam is internally incident thereon propagates through said member and is incident on said base surface at an angle less than the critical angle for total internal reflection, whereby said orthogonal light beam is transmitted through said base surface.

8. The combination claimed in claim 7 and further including, light utilization means disposed to receive light of said orthogonal beam that is transmitted through said base surface.

9. An optical device for changing the directions of propagation of light beams comprising, a transparent prismatic member that exhibits birefringent effects to first and second orthogonal plane polarized light beams, said member having a planar base surface and first and second oppositely inclined planar side surfaces that join said base surface to form acute corner angles of said prismatic member, means for directing a first beam of plane polarized light through said first side surface and thence onto said base surface, the corner angle formed by said first side surface and said base surface being proportioned to direct said first beam of light onto said base surface at an angle greater than the critical angle of internal reflection, the corner angle formed by said second side surface and said base surface being proportioned so that the first beam of light reflected from said base surface is incident at its internal polarizing angle on said second side surface, and means for directing onto a given surface of said prismatic member a second beam of light which is plane polarized orthogonally to said first beam, said two light beams being coincident at one of the surfaces of said member and their internal paths between said base and second side surfaces being angularly displaced by an angle which is a function of the difference in indices of refraction presented by said member to said orthogonally polarized beams.

10. The combination claimed in claim 9 wherein said second beam of light is incident on said second side surface and is coincident there with said first beam.

References Cited

C. C. Wang and G. W. Racette, "Calcite Prisms as High-Power Laser Beam Combers," App. Optics, vol. 4, No. 6 (June 1965), pp. 759–761.

DAVID SCHONBERG, *Primary Examiner.*

PAUL R. MILLER, *Assistant Examiner.*

U.S. Cl. X.R.

350—147, 150, 152, 169, 286